United States Patent
Baba et al.

(10) Patent No.: US 7,477,430 B2
(45) Date of Patent: Jan. 13, 2009

(54) TRANSPARENCY CONVEYING APPARATUS AND IMAGE READING APPARATUS

(75) Inventors: Teruo Baba, Nagano (JP); Hisayuki Akahane, Nagano (JP); Harrick Selvan, Singapore (SG); Letchumanan Thiagarajan, Singapore (SG)

(73) Assignee: Seiko Epson Corporation, Tokyo (JP)

( * ) Notice: Subject to any disclaimer, the term of this patent is extended or adjusted under 35 U.S.C. 154(b) by 812 days.

(21) Appl. No.: 10/946,253

(22) Filed: Sep. 20, 2004

(65) Prior Publication Data
US 2005/0134943 A1 Jun. 23, 2005

(30) Foreign Application Priority Data
Sep. 18, 2003 (JP) .......................... P2003-326353

(51) Int. Cl.
*H04N 1/04* (2006.01)
(52) U.S. Cl. ................. 358/487; 358/506; 358/498; 358/496; 348/96; 348/97; 348/98; 347/129; 347/112; 347/111; 399/365; 399/367; 399/378
(58) Field of Classification Search ............... 347/129, 347/112, 111; D14/420, 356, 300, 453, 432; 368/62, 82, 83, 223, 269, 241; 358/487, 358/474, 471, 400
See application file for complete search history.

(56) References Cited

U.S. PATENT DOCUMENTS

| | | | | |
|---|---|---|---|---|
| 3,178,020 A | * | 4/1965 | Zeutschel et al. ........... 209/657 |
| 4,064,441 A | * | 12/1977 | Casale ................... 250/363.08 |
| 5,005,817 A | * | 4/1991 | Ruch et al. ................. 271/9.08 |
| 5,358,239 A | * | 10/1994 | Hario et al. ................. 271/303 |
| 5,816,569 A | * | 10/1998 | Hoshi et al. ................. 271/117 |
| 5,873,939 A | * | 2/1999 | Doyle et al. ................. 118/213 |
| 5,890,822 A | * | 4/1999 | Saikawa et al. ........... 400/647.1 |
| 5,909,537 A | * | 6/1999 | Furukawa et al. ............. 358/1.9 |
| 6,047,960 A | * | 4/2000 | Kawano et al. ............. 271/184 |
| 6,066,206 A | * | 5/2000 | Doyle et al. ................ 427/98.5 |
| 6,207,220 B1 | * | 3/2001 | Doyle et al. ................ 427/98.4 |

FOREIGN PATENT DOCUMENTS

| | | |
|---|---|---|
| JP | 11-098310 | 4/1999 |
| JP | 2001-358875 | 12/2001 |

* cited by examiner

*Primary Examiner*—Mark K Zimmerman
*Assistant Examiner*—Louie Cao
(74) *Attorney, Agent, or Firm*—Edwards Angell Palmer & Dodge LLP; John J. Penny, Jr.

(57) ABSTRACT

A transparency conveying apparatus is provided with: a first rail for guiding one end of a transparency; a second rail for guiding the other end portion, which is provided parallel to the first rail with the transparency reading region placed between the first and second rails; a first belt for conveying the transparency along the first rail, which faces the first rail in a position where the one end is inserted between the first belt and the first rail; a second belt for conveying the transparency along the second rail, which faces the second rail in a position where the other end is inserted between the second belt and the second rail; a first engagement member for engaging the one end with the first belt; a second engagement member for engaging the other end with the second belt; and a drive unit for rotating the first and second belts.

5 Claims, 17 Drawing Sheets

TRANSPARENCY CONVEYING APPARATUS AND IMAGE READING APPARATUS

This patent application claims priority from Japanese patent applications Nos. 2003-326353 filed on Sep. 18, 2003, the contents of which are incorporated herein by reference.

BACKGROUND OF THE INVENTION

The present invention relates to a transparency conveying apparatus and an image reading apparatus using the same.

In general, a film scanner reads a film by holding the film in a holder for conveyance. Patent documents 1 and 2 each disclose an image reading apparatus with a transparency conveying apparatus for conveying a strip film without holding the strip film by means of a holder for conveyance.

However, it is difficult for the image reading apparatus described in Patent document 1 to hold a film flat in a document reading region between rollers, which are provided apart from each other in the direction in which a film is conveyed, and therefore, there is a risk that a film is shifted from the focal point in the optical system, resulting in an image that is out of focus, or a bent film may be read out, resulting in a warped image.

In addition, there is a risk in the image reading apparatus described in Patent document 2, wherein a roller that is pressed against an image recording region of a film may damage or stain the region.

Furthermore, the image reading apparatuses described in Patent documents 1 and 2 cannot read out a variety of sizes of reflection copies.

Patent document 1: Japanese Published Unexamined Patent Application Hei-11-98310
Patent document 2: Japanese Published Unexamined Patent Application 2001-358875

SUMMARY OF THE INVENTION

A first object of a invention is to provide a transparency conveying apparatus for allowing a high quality image to be read out from a transparency without damaging an image recording region of a film and without consuming time and labor for mounting the transparency in a holder for conveyance.

In addition, a second object of an invention is to provide a flat bed type image reading apparatus for allowing a high quality image to be readout from a transparency without damaging an image recording region of a film and without consuming time and labor for mounting the transparency in a holder.

In order to achieve the above described objects, the transparency conveying apparatus according to the first invention is a transparency conveying apparatus for conveying a transparency to a document reading region of an image reading apparatus, characterized by being provided with: a first rail for guiding one end portion of a transparency; a second rail for guiding the other end portion of the transparency, which is provided in parallel to the above described first rail in such a manner that the above described document reading region is, located between the first and second rails; a first belt for conveying a transparency along the above described first rail, which faces the above described first rail in a position where one end portion of the transparency is inserted between the first belt and the first rail; a second belt for conveying a transparency along the above described second rail, which faces the above described second rail in a position where the other end portion of the transparency is inserted between the second belt and the second rail; a first engagement member for engaging one end portion of the transparency to the above described first belt; a second engagement member for engaging the other end portion of the transparency to the above described second belt; and a drive unit for rotating the above described first and second belts in sync. The both end portions of a transparency are respectively engaged with the belts, and the two belts are rotated in sync while guiding the both end portions of the transparency with two rails which are provided in such a manner that the document reading region is located between the two rails, and thereby, the transparency can be conveyed to the document reading region without physically contacting an image recording region located in the center portion of the transparency and without mounting the transparency in a holder for conveyance. When a transparency is conveyed to the document reading region without physically contacting the image recording region, it becomes possible to readout a high quality image from the transparency by means of the image reading apparatus without damaging the image recording region.

Furthermore, the transparency conveying apparatus according to the first invention is characterized in that the above described first engagement member has a first elastic body for pressing one end portion of a transparency against the above described first belt, and the above described second engagement member has a second elastic body for pressing the other end portion of a transparency against the above described second belt. The transparency is pressed against the belts as a result of the elasticity of the elastic bodies, and thereby, the transparency can be conveyed by the belts without slipping and without failure.

Furthermore, the transparency conveying apparatus according to the first invention is characterized in that the above described drive unit has: a first pulley pair around which the above described first belt runs; a first support for supporting the first pulley pair in a freely rotating manner in a position where the above described first belt is tensioned and in a straight line; a second pulley pair around which the above described second belt runs; and a second support for supporting the second pulley pair in a freely rotating manner in a position where the above described second belt is tensioned and in a straight line. The pulley pairs allow the belts to be tensioned and in straight lines while being rotated, and thereby, the transparency can be prevented from being lifted off the rails while on the linear section as a result of the tension of the belts. A transparency can be prevented from being lifted off the rails, and thereby, the transparency can be positioned by means of the rails at the focal position, where the image reading apparatus can read out a sharp image.

Furthermore, the transparency conveying apparatus according to the first invention is characterized in that introduction portions of the above described first and second rails are bent in a same shape. The introduction portions of the two parallel rails are bent along the same trajectory of a line segment parallel displacement, and thereby, a warp of the transparency in the direction perpendicular to the direction in which the transparency is conveyed can be corrected before the transparency enters the document reading region. The transparency is conveyed to the document reading region in a condition having no warps, and thereby, a sharp image can be readout by the image reading apparatus. Furthermore, the belts are rotated while being tense and in straight lines by means of the pulley pairs, and thereby, the transparency can be conveyed while the both end portions of the transparency are pulled toward the directions opposite to each other by means of the two belts and the two rails, so that the transparency can be prevented from being warped to its original form while on the straight segment as a result of the tension of the belts.

Furthermore, the transparency conveying apparatus according to the first invention is characterized in that the above described drive unit includes a rotation axis having an end portion provided with a knob. The knob is provided so that the belts for conveying a transparency can be manually rotated, and thereby, it becomes easier to remove a transparency that has been jammed along the conveyance path.

In order to achieve the above described objectives, the image reading apparatus according to the second invention is an image reading apparatus having a transparency conveying apparatus according to the first invention, characterized by being provided with: a transparent table that includes a board surface on which the above described first and second rails can be mounted; a first illumination unit for illuminating the above described document reading region from the board surface side of the above described table; a second illumination unit for illuminating the above described table from the bottom surface side of the above described table; and a reading unit for reading out a transmission light image of the transparency that is illuminated by the above described first illumination unit, and for reading out a reflection light image of the reflection copy that is illuminated by the above described second illumination unit. A flat bed type image reading apparatus having illumination unit on both sides of the table is provided with a transparency conveying apparatus according to the first invention, and thereby, time and labor for mounting a transparency in a holder for conveyance can be saved, and a high quality image can be read out from the transparency without damaging the image recording region of a film. In addition, the rails for guiding a transparency are mounted on the table and it is easy to reduce the thickness of the rails in comparison with other guiding member such as rollers, and thereby, a transparency can be placed in the proximity of the board surface of the table on which a reflection copy is directly mounted so as to be read out. Accordingly, a sharp image can be read out from a transparency by mounting rails for guiding the transparency on the table.

Furthermore, the image reading apparatus according to the second invention is characterized in that the above described transparency conveying apparatus allows the above described first and second rails to be pressed against the above described table as a result of the weight of the above described transparency conveying apparatus. The rails and the table are pressed against each other as a result of the weight of the transparency conveying apparatus, and thereby, a transparency can be positioned at a predetermined distance away from the table without failure in a simple structure.

Furthermore, the image reading apparatus according to the second invention is characterized by: a third rail for guiding one end portion of a transparency, which is provided apart from the above described first rail in the direction in which the above described first rail extends; and a fourth rail for guiding the other end portion of the transparency, which is provided parallel to the above described third rail apart from the above described second rail in the direction in which the above described second rail extends, wherein the above described first illumination unit illuminates white reference reading regions, including in a gap between the above described first and third rails, and in a gap between the above described second and fourth rails. The rails for guiding end portions on the both sides of a transparency are respectively divided, and thereby, a white reference reading region having a width greater than that of the document reading region between the two rails can be formed along the conveyance path of the transparency. Accordingly, even in the case where a document reading region that has been set by a reading unit and a document reading region that has been set by the transparency conveying apparatus are shifted in relation to each other within a certain degree of tolerance, a white reference with a sufficient width can be acquired, which corresponds to the document reading region that has been set in the transparency conveying apparatus. In addition, the document reading region and the white reference reading region can be located in proximity to each other by forming the white reference reading region along the conveyance path, and therefore, white reference with more precision can be acquired.

The image reading apparatus according to the second invention is characterized in that: the above described third and fourth rails are provided in positions apart from the above described table so that a mounted film enters the gap in the condition where the above described first and second rails are mounted on the above described table; and the above described first illumination unit illuminates a second document reading region between the above described third and fourth rails. The conveyance path for a transparency is partially placed away from the table so that a document reading region for a mounted film can be set directly beneath the path for conveying the transparency, and thereby, a mounted film can be read out with a high quality.

Furthermore, the transparency conveying apparatus according to the second invention is characterized in that the above described third and fourth rails are provided so as to be freely removable. It becomes easy to remove a transparency that has been jammed along the conveyance path by making the rails partially removable.

DETAILED DESCRIPTION OF PREFERRED EMBODIMENTS

In the following, a description in given on the basis of the embodiments of the present invention.

Figure 1:
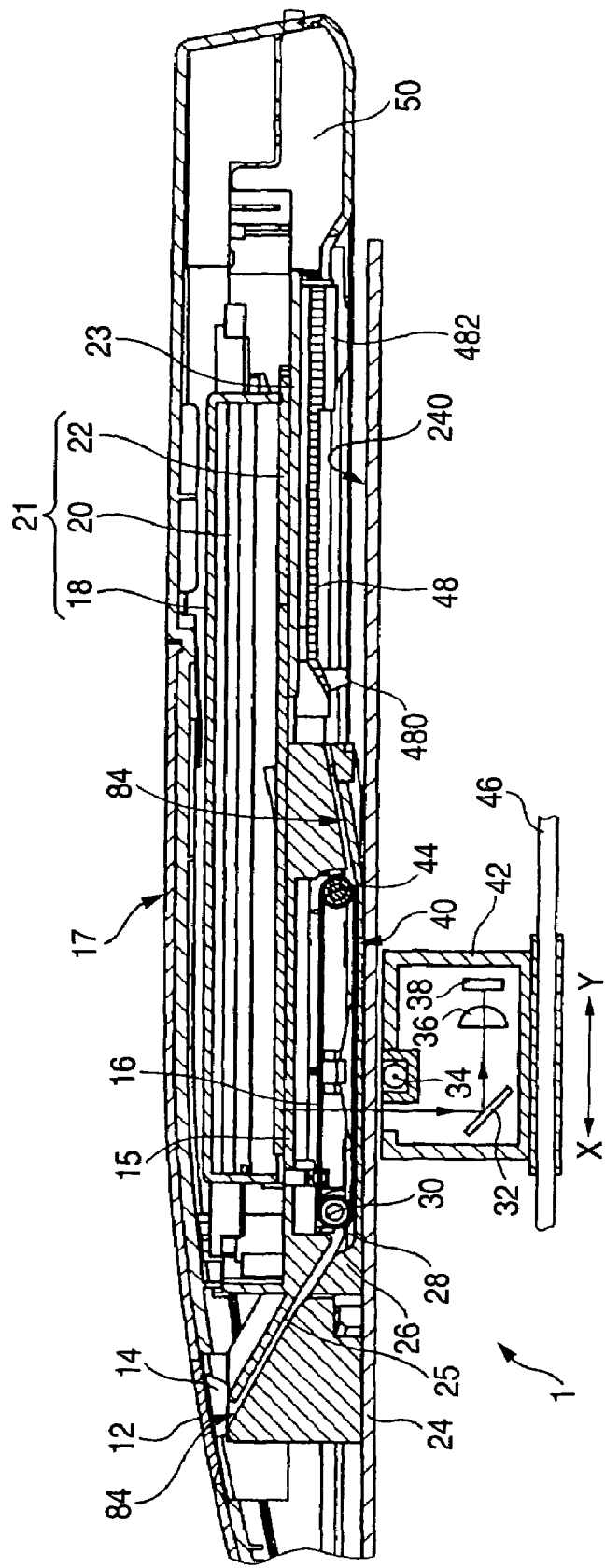
FIG. 1 is a cross-sectional view showing one embodiment of the present invention.

FIG. 1 is a cross-sectional view showing the internal structure of an image scanner 1, which is an image reading apparatus according to one embodiment of the present invention. Image scanner 1 is of a so-called flat bed type for reading a document placed on a table 24. Table 24 is formed of a transparent plate such as a glass plate, and materials such as a printed document, a photograph, and a book, are placed on a board surface 240 of the table.

A carriage 42, which is a reading unit, is engaged with a guide rod 46, which is parallel to board surface 240 of table 24, so as to freely slide. A second light source 34, which is a second illumination unit, is mounted on carriage 42. In addition, a mirror 32, a lens 36 and an image sensor 38, which form a reading unit, are mounted on carriage 42. Carriage 42 is pulled by belts which run around pulleys driven by a motor for carriage conveyance, not shown, so as to reciprocate in the directions of arrows X and Y parallel to board surface 240 of table 24. When second light source 34, mirror 32, lens 36 and image sensor 38 are conveyed in the directions X and Y parallel to the board surface of table 24 by means of carriage 42, the main scanning range with a narrow width for reading is moved in the direction of its width.

Here, the image reading apparatus may be of a mirror moving type, where the positions of image sensor 38 and lens 36 are fixed relative to table 24, and a number of mirrors are interlocked and shifted, and thereby, the main scanning range is shifted in the direction of its width, or a contact type image sensor may be used where a rod lens array is used in place of a minification optical system.

Second light source 34, which is the second illumination unit, is provided on the bottom surface side of table 24 and is formed of a tubular illumination apparatus such as a fluorescent tubular lamp, in which an inert gas such as xenon or neon and mercury are filled. Second light source 34 is mounted on carriage 42 so that the axis line in its longitudinal direction extends in the direction perpendicular to the axis line in the longitudinal direction of guide rod 46 and parallel to table 24. Light reflected from the document in the main scanning range that has been illuminated by second light source 34 is reflected from mirror 32 so as to enter lens 36, and is focused on the light receiving surface of image sensor 38 by means of lens 36. In addition, lens 36 and mirror 32 are placed in positions so that an image of the document placed on board surface 240 of table 24 is clearly formed on the light receiving surface of image sensor 38.

A first light source unit 21, which is a first illumination unit, is provided on the board surface side of table 24 and is formed of a first light source 20, a reflector 18 and a diffusion plate 22. First light source 20 is formed of a tubular illumination apparatus such as a fluorescent tubular lamp, in which an inert gas such as xenon or neon and mercury are filled. First light source 20 is provided in transparency conveying apparatus 17 so that the axis line in the longitudinal direction of the first light source extends parallel to the axis line in the longitudinal direction of guide rod 46. First light source 20 is set so that the center of the main scanning range is positioned directly beneath first light source 20. Reflector 18 is provided on the opposite side of table 24 relative to first light source 20. Diffusion plate 22 is provided on the same side of table 24 relative to first light source 20. Light emitted by first light source 20 is reflected from reflector 18 and is diffused by diffusion plate 22 so as to illuminate: a first reading region SS (see FIG. 11), where a frame of a 35 mm strip film, which is a reading object, is positioned at the time of reading; a second reading region SM, where a mounted film is positioned at the time of reading; and a white reference reading region SW, with a uniform intensity of illumination.

Image sensor 38, which is a reading unit, is a so-called linear image sensor where a number of cells, not shown, formed of photo diodes or the like are aligned in a straight line. Image sensor 38 is mounted on carriage 42 in a manner where a number of cells are aligned parallel to the central axis line of tubular second light source 34. A charge in accordance with the amount of the received light as a result of photoelectric conversion is stored in each cell of image sensor 38. The charge stored in each cell is transferred to an output portion of image sensor 38 by means of a CCD (Charge Coupled Device) or the like. An analog signal outputted from image sensor 38 is converted to a digital signal by means of an A/D converter, not shown, so as to be outputted from the A/D converter.

Figure 2:
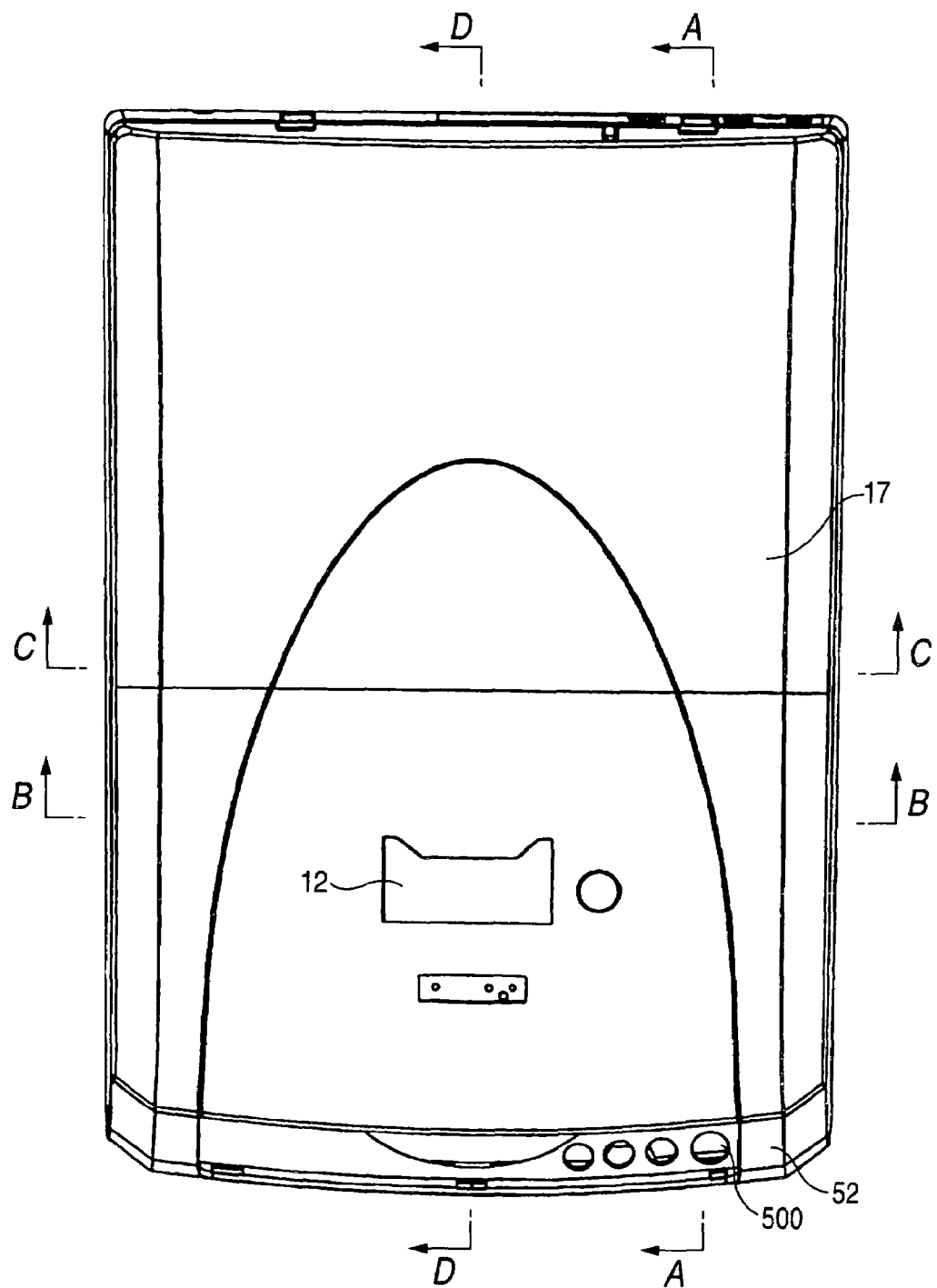
FIG. 2 is a plan view showing one embodiment of the present invention.
Figure 3:
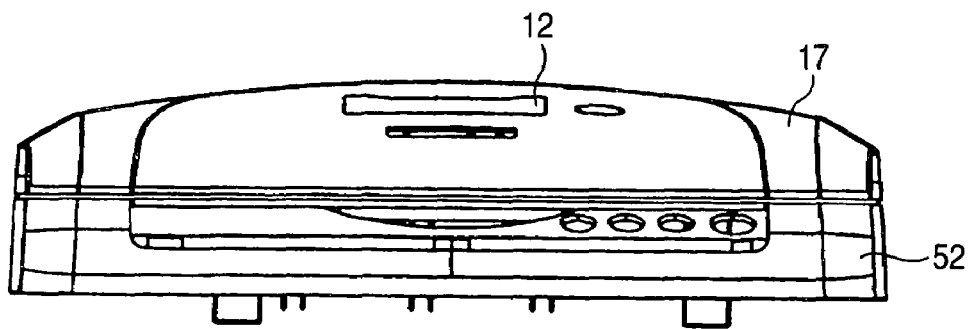
FIG. 3 is a frontal view showing one embodiment of the present invention.

FIG. 2 is a plan view showing the appearance of image scanner 1. FIG. 3 is a front view showing the appearance of image scanner 1. A transparency conveying apparatus 17 is provided in an upper portion of a body housing 52, the opening, not shown, of which is closed by table 24. A dust cover 12 is an openable and closable lid of a slit 14 for the document conveyance path described below.

Figure 4:
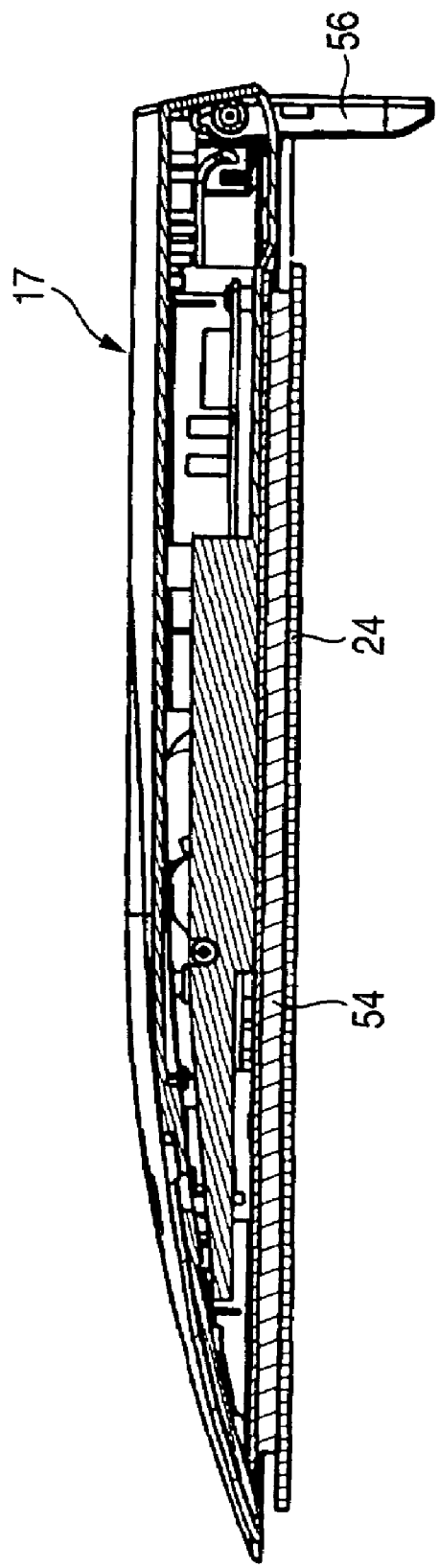
FIG. 4 is a cross-sectional view showing one embodiment of the present invention.
Figure 5:
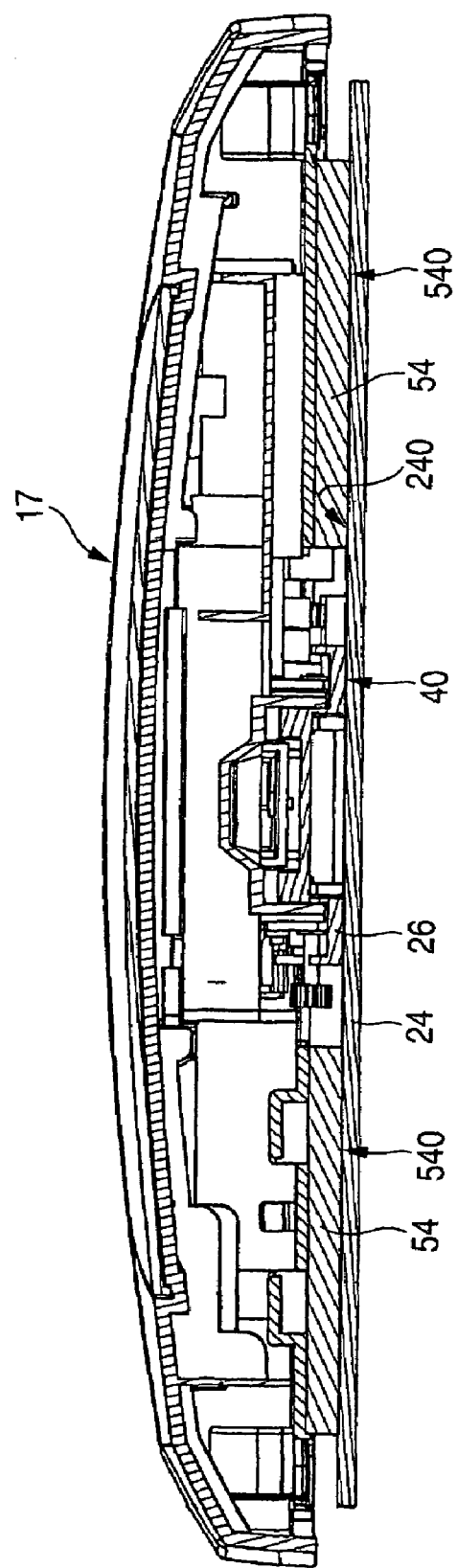
FIG. 5 is a cross-sectional view showing one embodiment of the present invention.

FIG. 4 is a cross-sectional view showing transparency conveying apparatus 17 and table 24, and corresponds to a cross-sectional view along line A-A of FIG. 2. FIG. 5 is a cross-sectional view showing transparency conveying apparatus 17 and table 24, and corresponds to a cross-sectional view along line B-B of FIG. 2.

Transparency conveying apparatus 17 is linked to body housing 52 by means of a hinge 56 so as to freely swing. When transparency conveying apparatus 17 is in the entirely closed condition, table 24 is covered by transparency conveying apparatus 17. A mat, not shown, is provided to the lower portion of transparency conveying apparatus 17 so as to be removable. The mat is attached when a reflection copy is read out and is removed when a transparency is readout. When the mat is removed from transparency conveying apparatus 17, as shown in FIG. 1, lower surface 40 of a first rail member 26 and board surface 240 of table 24 are pressed against each other as a result of the weight of transparency conveying apparatus 17. As shown in FIG. 4 and FIG. 5, supports 54 are provided on both sides of first rail member 26 so that transparency conveying apparatus 17 can be stably mounted on board surface 240 of table 24. When lower surface 40 of first rail member 26 is pressed against board surface 240 of table 24, slight gaps are created between lower surfaces 540 of supports 54 and board surface 240 of table 24.

Figure 6:
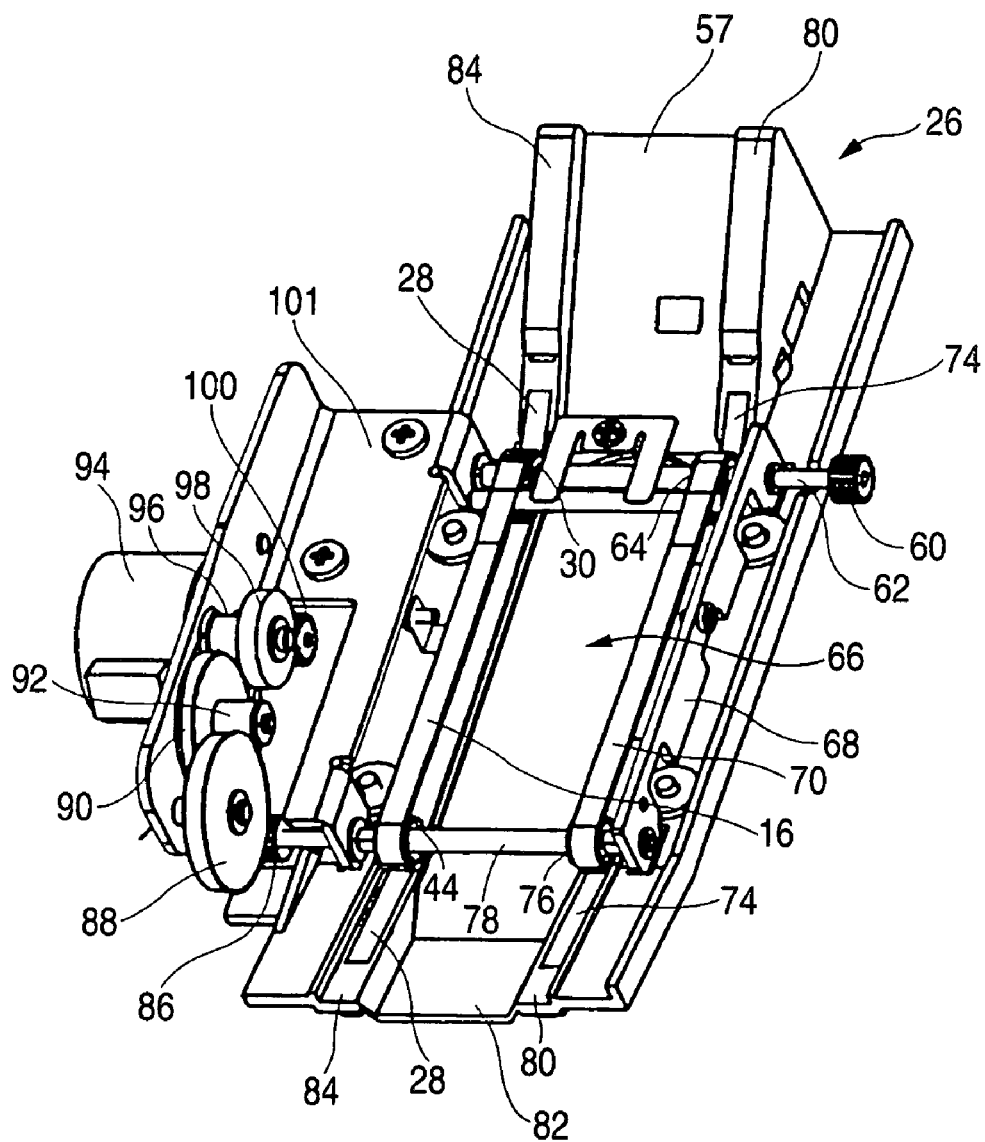
FIG. 6 is a perspective view showing one embodiment of the present invention.

FIG. 6 is a perspective view showing a conveyance mechanism of transparency conveying apparatus 17. An opening 66 is formed in first rail member 26 so as to correspond to first reading region SS (see FIG. 11). Opening 66 is positioned at approximately the center of the main scanning range of image sensor 38. A first rail 84 and a second rail 80 are formed on both sides of opening 66 so as to be parallel to each other. First rail 84 guides one track of a 35 mm strip film in the direction parallel to an imaginary plane that includes the axis line in the longitudinal direction of guide rod 46 of carriage 42, and second rail 80 guides the other track of the film in the direction parallel to a virtual plane that includes the axis line in the longitudinal direction of guide rod 46 of carriage 42. Connection portions 57 and 82 that connect first rail 84 to second rail 80 are formed in positions one step lower than first rail 84 and second rail 80 so as not to make contact with the film. The distance between first rail 84 and second rail 80 is greater than 24 mm, which is the width of the image recording region of a 35 mm strip film (hereinafter referred to as film), so that neither rail makes contact with the image recording region of the film. First rail 84 and second rail 80 are flat in the middle portions, with the two end portions declining toward the center.

Figure 7A:
FIGS. 7A and 7B is schematic diagrams showing one embodiment of the present invention.

A first plate spring 28, which is a first elastic body, is mounted on first rail 84. A second plate spring 74, which is a second elastic body, is mounted on second rail 80. First plate spring 28 is curved in the vicinity of the two end portions so as to be elevated from first rail 84, as shown in FIG. 7(A). Second plate spring 74 has the same form as first plate spring 28, and is curved in the vicinity of the two end portions so as to be elevated from second rail 80.

Figure 7B:
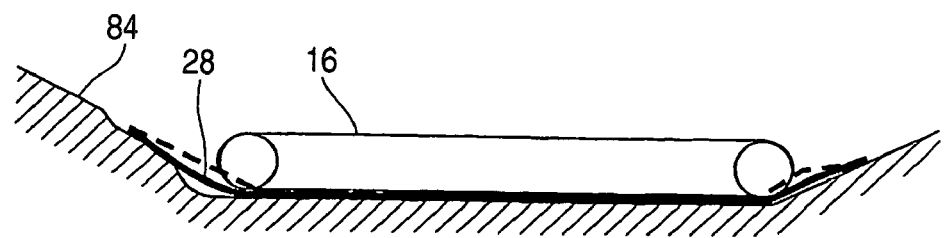

First belt 16 is provided on first rail 84 so as to press down first plate spring 28, as shown in FIG. 7(B). Second belt 70 is provided on second rail 80 so as to press down second plate spring 74. When first belt 16 and second belt 70 are provided so as to press down first plate spring 28 and second plate spring 74, the end portion of first plate spring 28 on the slit side (which corresponds to the introduction portion of the first rail according to the claims) and the end portion of second plate spring 74 on the slit side (which corresponds to the introduction portion of the second rail according to the claims) are curved in a same shape so as to be pressed against the end portions of first belt 16 and second belt 70, on the sides opposite to the slit sides, respectively. In addition, the end portion of first plate spring 28 on the side opposite to the slit side and the end portion of second plate spring 74 on the side opposite to the slit side are curved along the same trajectory of a line segment parallel displacement so as to be pressed against the end portions of first belt 16 and second belt 70, on the sides opposite to the slit sides, respectively. When a film is guided from slit 14 to first rail member 26 so as to reach the end portions of first belt 16 and second belt 70 on the slit sides, one of the tracks of the film is pressed against first belt 16 as a result of the elasticity of first plate spring 28, and the other track of the film is pressed against second belt 70 as a result of the elasticity of second plate spring 74.

In the section where first plate spring 28 and second plate spring 74 are provided, a film slides while making contact with first plate spring 28 and second plate spring 74. That is to say, first plate spring 28 functions as a first rail in addition to functioning as a first elastic body as described in the claims. In addition, second plate spring 74 functions as a second rail in addition to functioning as a second elastic body as described in the claims.

As shown in FIG. 6, first belt 16 runs around a pulley 30 and a pulley 44, which make a first pulley pair. Second belt 70 runs around a pulley 64 and a pulley 76, which make a second pulley pair. A driving shaft 78, to which pulleys 44 and 76 are secured, and a following shaft 62, to which pulleys 30 and 64 are secured, are supported by a metal plate frame 101, which is secured to first rail member 26, so as to be rotated freely. Metal plate frame 101, which serves as first and second supports, supports driving shaft 78 and following shaft 62 in a position where first belt 16 and second belt 70 are pulled by the pulley pairs so as to be tensioned and in straight lines. First belt 16 and second belt 70 are pulled by the pulley pairs so as to be tensioned and in straight lines, and thereby, the track of a film can be prevented from being elevated from first plate spring 28, which functions as a first rail, and second plate spring 74, which functions as a second rail, in the middle portions of the pulley pairs around which first belt 16 and second belt 70 run. In addition, a film that involves the warp in the direction of the width which is corrected in the front end portion of first plate spring 28 and in the front end portion of second plate spring 74 can be prevented from returning to its warped condition in the middle portions of first belt 16 and second belt 70. A motor 94 for conveying a transparency is fixed to metal plate frame 101. Motor 94 for conveying a transparency conveys torque to driving shaft 78 by means of gears 100, 98, 9.6, 90, 92, 88 and 86. A knob 60 for manually rotating first belt 16 and second belt 70 is secured to one end portion of following shaft 62.

Here, first belt 16 and second belt 70 may be timing belts which are toothed so as to engage with the pulleys, or may be belt which are not toothed for engagement with the pulleys. In addition, first belt 16 and second belt 70 may be driven by one motor or may be driven by two motors which are controlled in sync. In addition, first belt 16 and second belt 70 may be slacked between the pulleys, and first belt 16 and second belt 70 may be pressed on the side of first rail member 26 by the pulleys provided inside first belt 16 and second belt 70, respectively.

Figure 8:
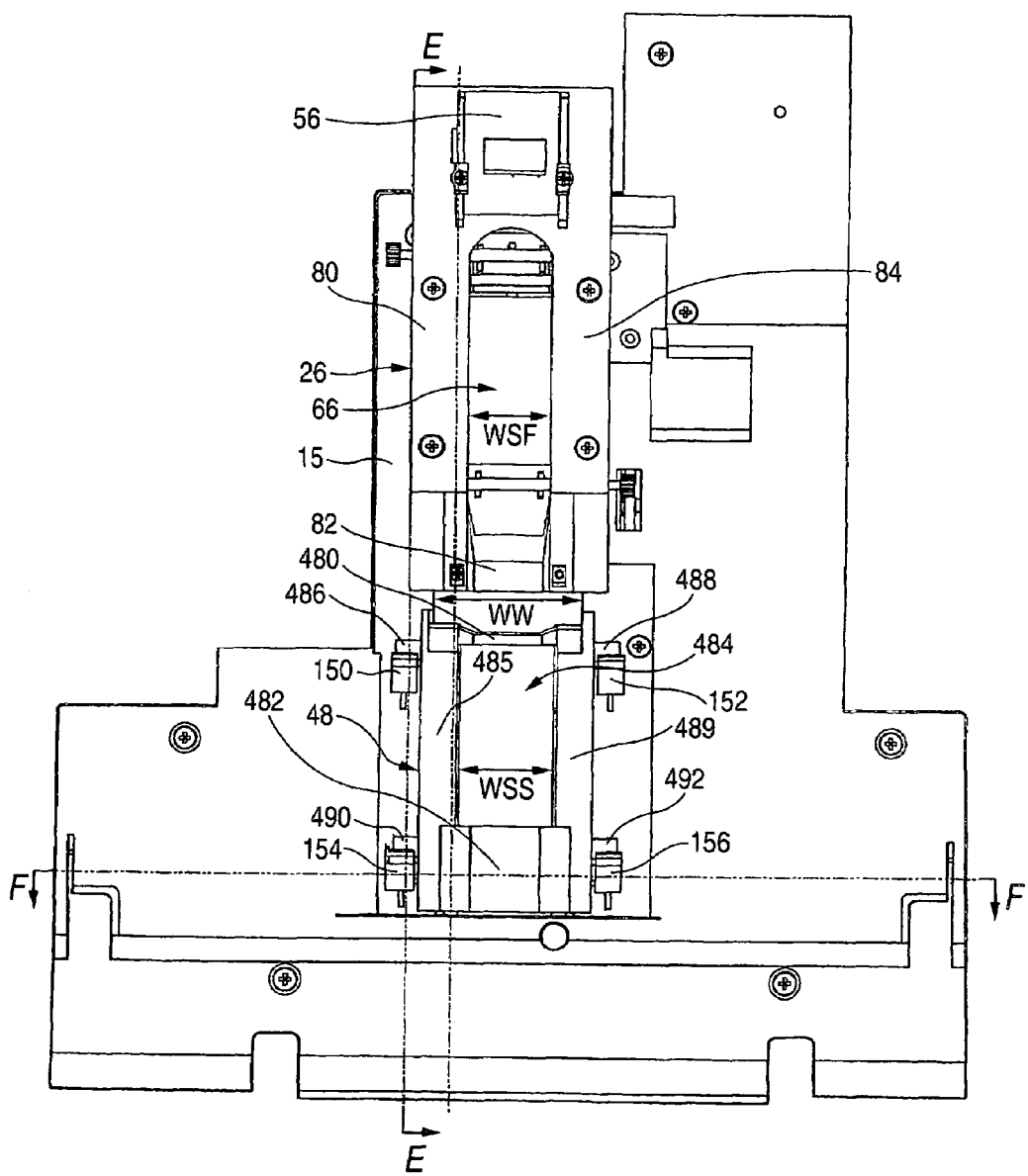
FIG. 8 is a bottom view showing one embodiment of the present invention.

FIG. 8 is a bottom view showing a portion of transparency conveying apparatus 17.

First rail member 26 is screwed onto a substrate 15. Second rail member 48 is engaged with substrate 15 so as to be freely removable, on the side opposite to the slit side of first rail member 26 at a predetermined distance away from first rail member 26. Second rail member 48 has a third rail 485, which is located on a line extending from first rail 84 and which extends in parallel to an imaginary plane that includes the central axis line of guide rod 46 of carriage 42, and a fourth rail 489, which is located on a line extending from second rail 80 and which extends in parallel to an imaginary plane that includes the central axis line of guide rod 46 of carriage 42. Third rail 485 and fourth rail 489 are linked to each other at a predetermined distance away from each other by means of a frontal connection portion 480 and a rear connection portion 482. Frontal connection portion 480 and rear connection portion 482 are formed at positions one step lower than third rail 485 and fourth rail 489 so as not to make contact with the image recording region of a film. An opening 484 between third rail 485 and fourth rail 489 corresponds to second reading region SM (see FIG. 11). Opening 484 is positioned approximately at the center of the main scanning range of image sensor 38.

Figure 9:
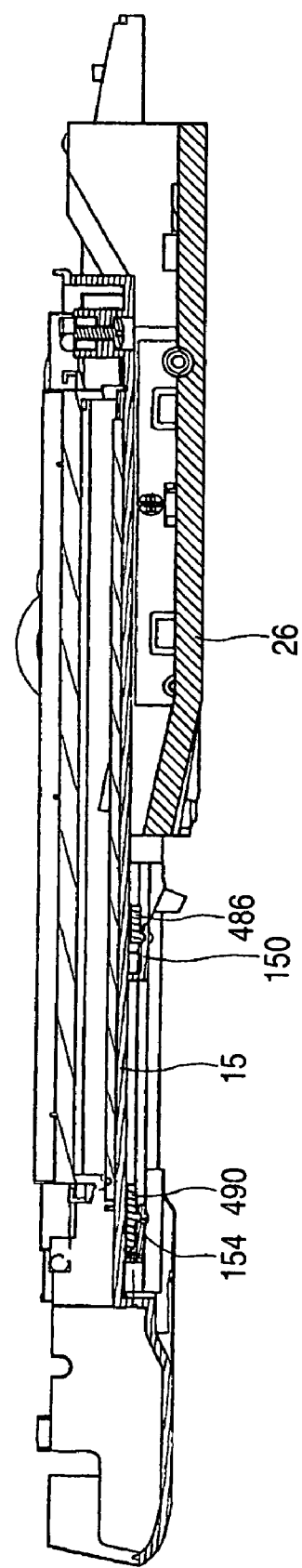
FIG. 9 is a cross-sectional view along line E-E of FIG. 8.
Figure 10:
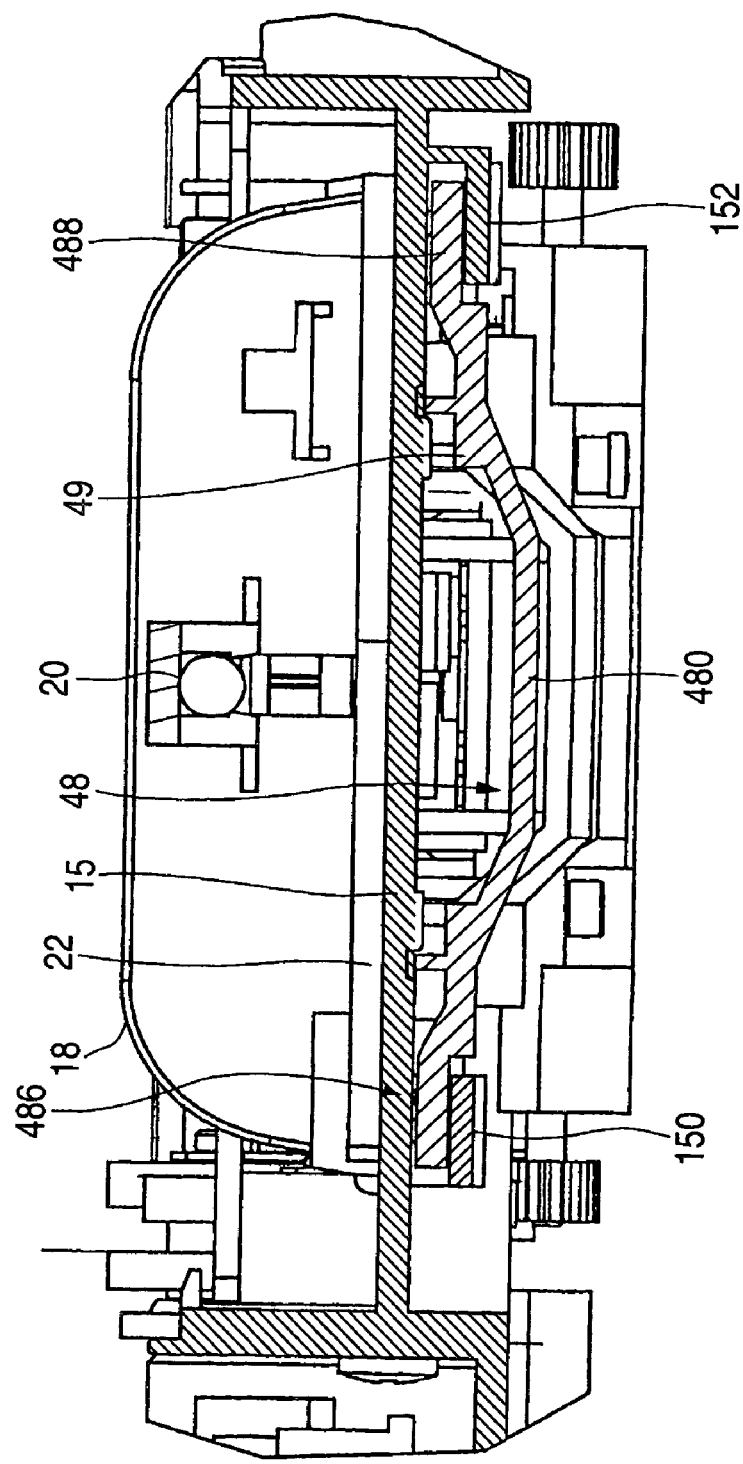
FIG. 10 is a cross-sectional view along line F-F of FIG. 8.

Protruding portions 486 and 490 protrude from third rail 485. Protruding portions 488 and 492 protrude from fourth rail 489. As shown in FIG. 9 and FIG. 10, protruding portions 486 and 490 engage with engagement portions 150 and 154 of substrate 15, which are elastically transformable, so as to be freely removable, while protruding portions 488 and 492 engage with engagement portions 152 and 156 of substrate 15, which are elastically transformable, so as to be freely removable. When second rail member 48 is removed from substrate 15, the conveyance path for a film is uncovered so that a film that has been jammed along the conveyance path can be easily removed. In addition, at this time, a driving mechanism including first belt 16, second belt 70 and the like is not exposed, and therefore, foreign objects hardly enter the driving mechanism.

As shown in FIG. 1, second rail member 48 is positioned in such a manner that second rail member 48 and board surface 240 of table 24 are apart from each other. A mounted film can be mounted on second reading region SM (see FIG. 11) on the board surface of table 24 beneath second rail member 48. Second rail member 48 is placed at a distance from board surface 240 of table 24, and thereby, second reading region SM and first reading region SS can be aligned in the vicinity of the optical axis of the optical system. As a result of this, a strip film that is positioned in first reading region SS and a mounted film that is positioned in second reading region SM both allow their images to be formed on image sensor 38 by using a portion of the optical system in the vicinity of the center of the optical axis.

Here, third rail 485 and fourth rail 489 may be formed of one part, or may be formed of separate parts.

Figure 11:
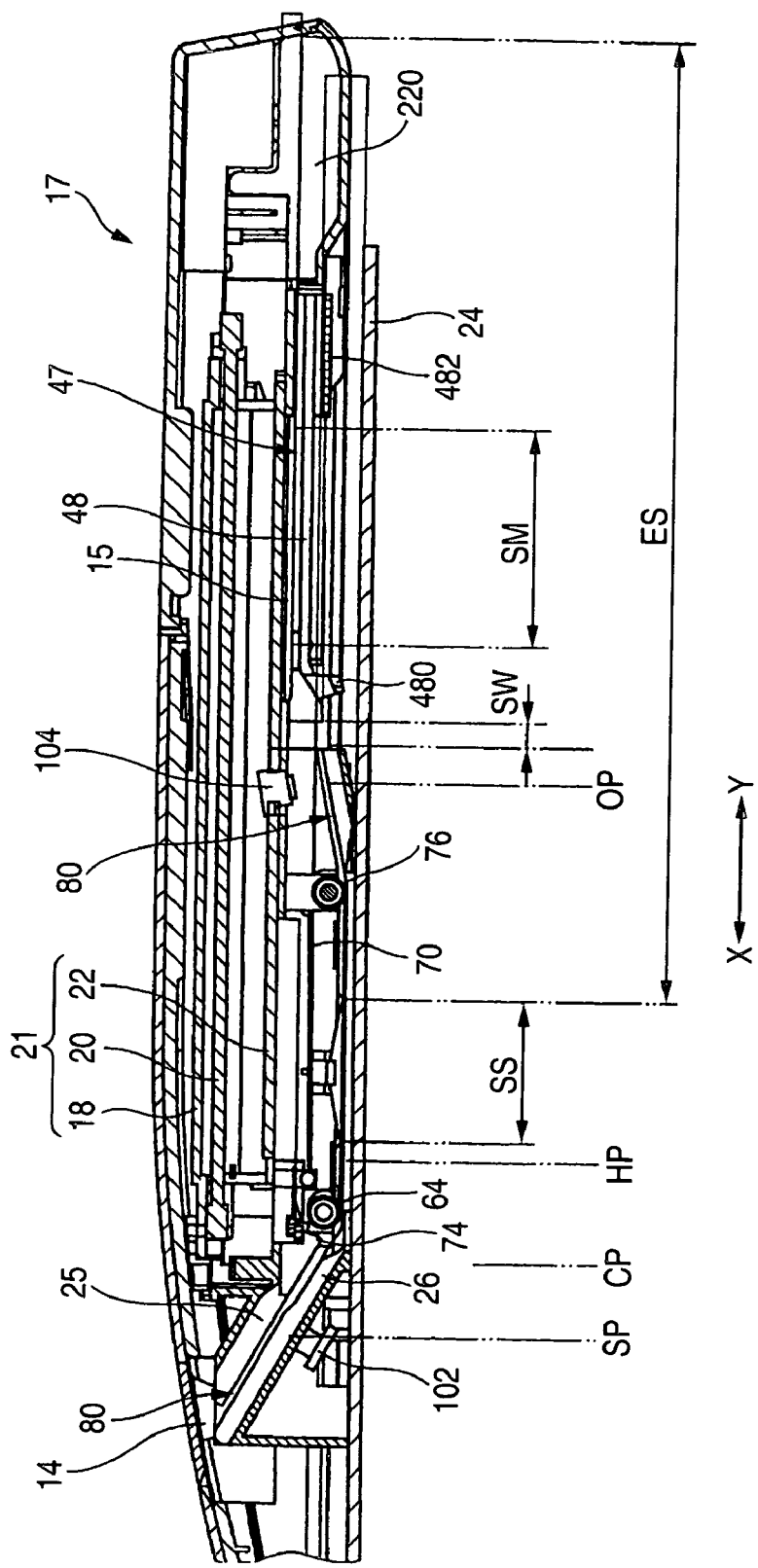
FIG. 11 is a cross-sectional view showing one embodiment of the present invention.

FIG. 11 is a cross-sectional view showing transparency conveying apparatus 17 and table 24, and corresponds to a cross-sectional view along line D-D of FIG. 2. The introduction portion of the conveyance path for a film is a gap between first rail member 26 and pressing member 25. A driving section of the conveyance path is located between first plate spring 28 and first belt 16, as well as between second plate spring 74 and second belt 70. The conveyance path is elevated through a gap, which is formed by a rising section of the conveyance path, between first rail member 26 and substrate 15 on the side opposite to the introduction portion side of the driving section. A marginal section of the conveyance path is formed in the gap between first rail member 48 and substrate 15. The front end of second rail member 48 is located away from the rear end of first rail member 26, and therefore, the gap between second rail member 48 on the introduction portion side and substrate 15 is widened so as to prevent a curved film from deviating from the conveyance path. A marginal section of the conveyance path continues to a marginal space 220 that is formed behind second rail member 48.

A white reference reading region SW is set in a gap between first rail member 26 and second rail member 48. A white reference reading region SW is set in a section in which first rail member 26 and second rail member 48 are apart from each other, and therefore, as shown in FIG. 8, width WW of white reference reading region SW is sufficiently greater than width WSF of first reading region SS. In addition, width WW of white reference reading region SW is sufficiently greater than width WSS of second reading region SM. As a result of this, even in the case where the positions or the angles of first reading region SS and second reading region SM relative to body housing 52 slightly differ product by product, white reference having a width required for shading correction of a document mounted on first reading region SS or second reading region SM can be acquired without fail.

A first position sensor 102 is provided in a position so as to respond when the front end of a film that has been inserted from slit 14 is guided by first rail member 26 and reaches insertion detecting position SP of the introduction portion of the conveyance path.

A second position sensor 104 is provided in a position so as to respond when the front end of a film that has been conveyed on first belt 16 and second belt 70 reaches conveyance starting point OP in the rising section of the conveyance path.

Figure 12:
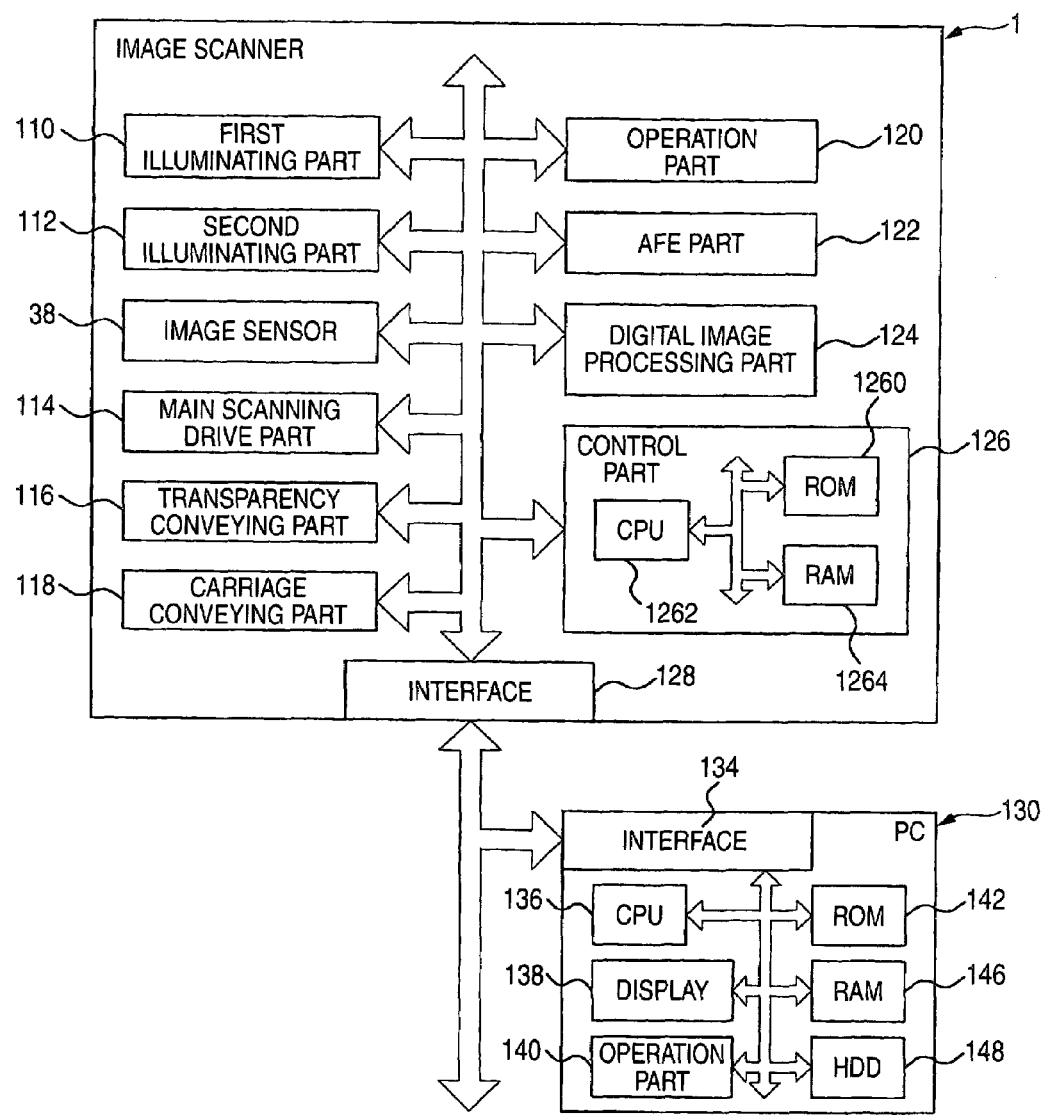
FIG. 12 is a block diagram showing one embodiment of the present invention.

FIG. 12 is a block diagram showing the entirety of the image reading apparatus formed of image scanner 1 and personal computer (PC) 130. Image scanner 1 and PC 130 are connected to each other by a communication line, for example a USB (universal serial bus) cable, via respective interfaces 128 and 134 so that the image reading apparatus is formed.

Image scanner 1 is provided with a control part 126, an operation part 120, a first illumination part 110, a second illumination part 112, an image sensor 38, a main scanning drive part 114, a transparency conveying part 116, a carriage conveying part 118, an analog front end (AFE) part 122, a digital image processing part 124, and interface 128.

Control part 126 is provided with a CPU 1262, a ROM 1260 and a RAM 1264. CPU 1262 executes programs stored in ROM 1260, and controls the respective parts of image scanner 1. ROM 1260 is a nonvolatile memory for storing a variety of programs and a variety of data, and RAM 1264 is a memory for temporarily storing a variety of programs and a variety of data.

Operation part 120 receives operations from the user carried out on the image reading apparatus, and transmits predetermined request signals to control part 126. Control part 120 is, for example, provided with a button 500 for starting up a program for controlling the scanner that has been stored in the hard disc (HDD) 148 of PC 130 described below, and thus a signal requesting the start-up of the above described application program is transmitted to control part 126 when the user presses down button 500.

First illumination part 110 is formed of the above described first light source 20, an inverter circuit for the first light source, not shown, a control circuit for the first illumination part, and the like. The control circuit for the first illumination part receives a first illumination part control signal that has been transmitted from control part 126, and controls the turning on and off of first light source 20. Second illumination part 112 is formed of the above described second light source 34, an inverter circuit for the second light source, not shown, a control circuit for the second illumination part, and the like. The control circuit for the second illumination part receives a second illumination part control signal that has been transmitted from control part 126, and controls the turning on and off of second light source 34.

Main scanning drive part 114, which is a reading unit, is a drive circuit for outputting a drive pulse required for driving image sensor 38 to image sensor 38, and is formed of, for example, a synchronizing signal generator, a drive timing generator and the like.

Transparency conveying part 116 is formed of the above described transparency conveying motor 94, a motor driving circuit for conveying a transparency, not shown, a circuit for controlling the transparency conveying part, and the like. The control circuit for the transparency conveying part receives a transparency conveyance control signal that has been transmitted from control part 126, and controls the direction of rotation, the speed of rotation and the like, of motor 94 for conveying a transparency.

Carriage conveying part 118 is formed of the above described motor for conveying a carriage, not shown, a motor driving circuit for conveying a carriage, a control circuit for the carriage driving part, and the like. The control circuit for the carriage driving part receives a carriage conveyance control signal that has been transmitted from control part 126, and controls the direction of rotation, the speed of rotation and the like, of the motor for conveying a carriage.

An AFE part 122, which is a reading unit, is formed of an analog signal processing part, an A/D converter, and the like. The analog signal processing part carries out amplification, noise reduction processing and the like on an analog image signal that has been outputted from image sensor 38. The A/D converter quantifies an analog signal that has been outputted from the analog signal processing part, and outputs a pixel value for the digital expression having a predetermined bit length to each of the cells of image sensor 38.

Digital image processing part 124 carries out processes such as shading correction and gamma correction on a pixel value that has been outputted from AFE part 122, so as to generate digital image data.

PC 130 is provided with a CPU 136, a ROM 142, a RAM 146, an HDD 148, a display 138, an operation part 140, and interface 134. CPU 136 carries out programs stored in ROM 142 and HDD 148 so as to control the respective parts of PC 130. ROM 142 is a nonvolatile memory for storing a variety of programs and a variety of data, and RAM 146 is a memory for temporarily storing a variety of programs and a variety of data. HDD 148 is a memory apparatus for storing a variety of programs and a variety of data. Display 138 is a displaying apparatus using a CRT or liquid crystal, and displays a digital image that has been read out. Operation part 140 is provided with a keyboard, a mouse and the like, not shown, so as to accept the operations of the user carried out on PC 130. Concretely speaking, an instruction to start the reading out of an image is received by operation part 140. The details are described below.

Programs which are executed in CPU 1262 and CPU 136, as well as a variety of data, may be downloaded from predetermined servers via a network so as to be inputted to image scanner 1 and PC 130.

Figure 13:
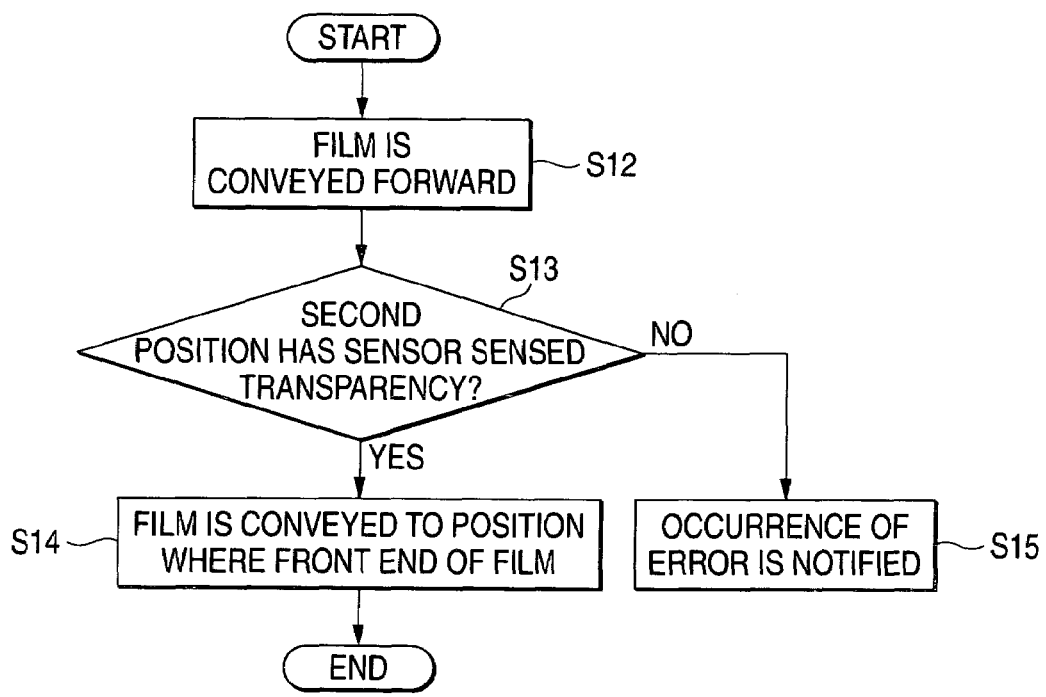
FIG. 13 is a flow chart of one embodiment of the present invention.

FIG. 13 is a flow chart of a loading operation in the image reading apparatus of the present embodiment. The loading operation consists of sequential initial operations which are carried out at the time when a film is inserted. In the following, the loading operation is described in reference to FIG. 11 and FIG. 13. In the following descriptions, a plurality of image recording regions in a film is referred to as frames. In addition, in the case where the direction in which a film is conveyed is described, the direction in which a film is conveyed after the film has been inserted through slit 14 (direction Y in FIG. 11) is referred to as the forward direction, while the opposite direction (direction X in FIG. 11) is referred to as the backward direction. In addition, an end portion on the front side of a film is referred to as the front end of the film, while an end portion on the rear side of a film is referred to as the rear end of the film. In addition, the frame closest to the rear end of a film is referred to as the final frame. In addition, an end portion closer to the front end in each frame of a film is referred to as the front end of the frame, while an end portion closer to the rear end in each frame of a film is referred to as the rear end of the frame A film that has been inserted through slit 14 is guided to first rail member 26 so as to reach insertion detecting position SP. The loading operation is started when first position sensor 102 senses the front end of the inserted film.

Control part 126 that has received a request signal of step S12 from first position sensor 102 gives transparency conveying part 116 an instruction to convey the inserted film forward. Then, transparency conveying part 116 rotates motor 94 for conveying a transparency. When the film reaches the end portions on the slit sides of first belt 16 and second belt 70, the film is conveyed forward by first belt 16 and second belt 70, which are driven by motor 94 for conveying a transparency, so that a warp of the film in the direction of the width is corrected (S12) due to a curvature of the conveyance path at the end portions of first plate spring 28 and second plate spring 74 on the slit side. First belt 16 and second belt 70 are pulled by the pulley pairs so as to be tensioned and in straight lines, and therefore, the film is not elevated in the middle portions of first belt 16 and second belt 70, and the film that has been corrected does not return to the warped condition.

When the front end of the film reaches OP and second position sensor 104 senses the front end of a transparency, second position sensor 104 outputs a signal for requesting step S14 to control part 126 (S13).

In step S14, transparency conveying part 116 rotates motor 94 for conveying a transparency in the reverse direction in response to the instruction of control part 126, and conveys the film to a position where the front end of the film agrees with home position HP on the slit side of first reading region SS. When the front end of the film reaches home position HP, transparency conveying part 116 stops motor 94 for conveying a transparency, thereby, completing the loading operation.

On the other hand, in the case where second position sensor 104 does not sense a transparency during a predetermined period of time, after first position sensor 102 has detected the insertion of a film, control part 126 carries out a control so that the user is notified of the occurrence of an error in step S15. Concretely speaking, for example, there is a method where control part 126 sends a notification of error occurrence information to PC 130 via interface 128 and interface 134, and a program for controlling a scanner allows display 138 to display the occurrence of an error.

Figure 14:
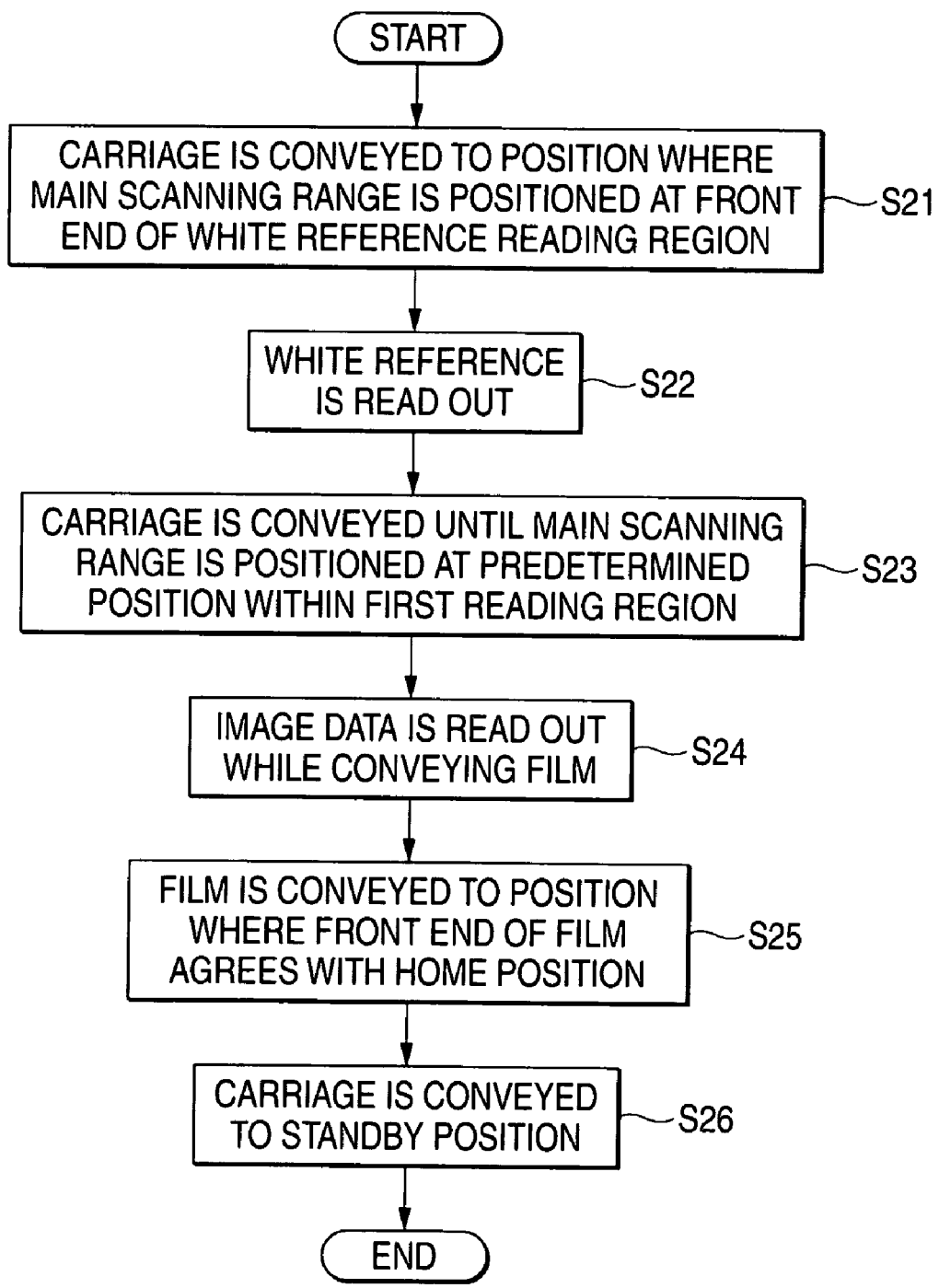
FIG. 14 is a flow chart of one embodiment of the present invention.

FIG. 14 is a flow chart of an image reading operation in the pre-scanning mode for a strip film. The pre-scanning mode indicates a reading mode of low resolution that is carried out prior to the main scanning. The pre-scanning is carried out, for example, in order to acquire image data of the entirety of frames for displaying a list required for a selection of a frame of the film that is to be read out in the main scanning mode, for a short period of time. In the following, the image reading operation in the pre-scanning mode for acquiring image data of the entirety of frames of a strip film is described.

When control part 126 receives a request for pre-scanning from the user, the image reading operation in the pre-scanning mode is started. A request for pre-scanning is made by the user, for example, according to a method where a pre-scanning initiation-button displayed on display 138 is clicked. When the pre-scanning initiation button displayed on display 138 is clicked by the user, CPU 136 transmits a request for pre-scanning to image scanner 1 in accordance with the program for controlling the scanner.

In step S21, carriage conveying part 118 conveys carriage 42 under the control of control part 126 until the main scanning range is positioned at the end portion of white reference reading region SW on the slit side in image scanner 1 that has received the request for pre-scanning.

In step S22, generation of image data of the main scanning range and a shift of carriage 42 are repeated until carriage 42 has been shifted to a position where the main scanning range is positioned at the end portion of white reference reading region SW on the side opposite to the slit side. The generation of image data of the main scanning range is carried out by generating an analog signal in accordance with the amount of light that has been emitted from first light source unit 21 and that has passed through the main scanning range, in image sensor 38 and by converting the analog signal into a digital signal in AFE part 122. In addition, the shift of carriage 42 is carried out by conveying carriage 42 in the direction in which carriage conveying part 118 moves away from slit 14. The average value of image data that has been generated for a plurality of lines in accordance with the-width of white reference reading region SW is stored in a memory as white reference so as to be utilized for shading correction in digital image processing part 124 described below. The shading correction corrects the dispersion of brightness of first light source unit 21 in the direction of the main scanning, reduction in the amount of light in the periphery of lens 36, the variation in the sensitivity of pixels in image sensor 38, and the like. In addition, white reference is image data that is utilized as the lightest value in shading correction, that is to say, the reference value of "white."

In step S23, carriage conveying part 118 conveys carriage 42 until the main scanning range is positioned at a predetermined position within first reading region SS.

In step S24, generation of image data of the main scanning range and a shift of the film are repeated until at least the main scanning range is positioned at the rear end of the final frame. The generation of image data of the main scanning range is carried out by generating in image sensor 38 an analog signal in accordance with the amount of light that has been emitted from first light source unit 21 and that has transmitted a frame in the main scanning range, and by converting the analog signal into a digital signal in AFE part 122. Image processing such as shading correction and gamma correction is carried out in digital image processing part 124 on the image data that has been outputted from AFE part 122, and after that, the image data is transmitted to PC 130. In addition, the shift of the film is carried out by conveying the film forward in transparency conveying part 116. At this time, the front end of the film is guided by first rail member 26 through the rising section, and is guided by second rail member 48 through the marginal section of the conveyance path, so as to reach marginal space 220. A rising section is provided in the conveyance path and a film is guided to the marginal section of the conveyance path that is apart from board surface 240 of table 24, and thereby, second reading region SM can be placed at the center of the main scanning range.

When the reading out up to the rear end of the final frame has been completed, transparency conveying part 116 conveys the film to the rear until the front end of the film agrees with home position HP in step S25.

In addition, in step S26, carriage conveying part 118 conveys carriage 42 to carriage standby position CP on the slit side of first reading region SS so that the image reading operation in the pre-scanning mode is completed.

Figure 15:
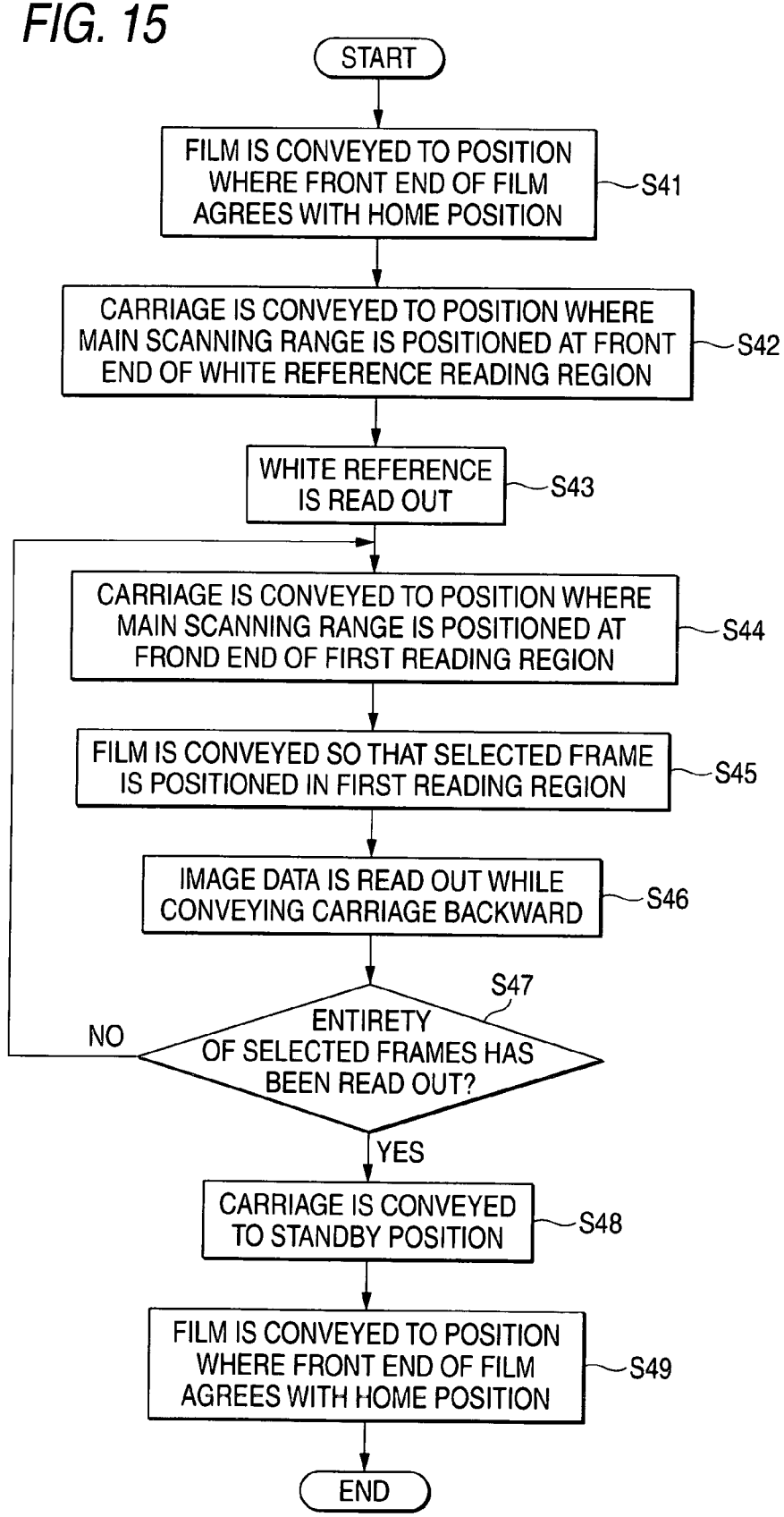
FIG. 15 is a flow chart of one embodiment of the present invention.

FIG. 15 is a flow chart of the reading operation in the main scanning mode of a strip film. In the following, the reading operation in the main scanning mode of a strip film is described.

When control part 126 receives a request for the main scanning from the user, control part 126 sends an instruction to carry out step S41 to transparency conveying part 116 so that the reading operation in the main scanning mode is started. The request for the main scanning is accepted, for example, when the user clicks so as to select a plurality of frames, which is the object of the main scanning, from among low resolution images of the entirety of frames shown in a list displayed on display 138 as a result of the reading operation in the pre-scanning mode, and then, the main scanning initiation button displayed on display 138 is clicked.

In step S41, transparency conveying part 116 conveys the film to a position where the front end of the film agrees with home position HP.

In step S42, carriage conveying part 118 conveys carriage 42 according to the instruction of control part 126, until the main scanning range is positioned at the end portion of white reference reading region SW on the slit side, in the same manner as in step S21.

In step S43, white reference is acquired and is stored in a memory in the same manner as in step S22.

In step S44, carriage conveying part 118 conveys carriage 42 in direction Y of FIG. 11, until the main scanning range is positioned at the end portion of first reading region SS on the side opposite to the slit side.

In step S45, transparency conveying part 116 conveys the film until the frame that has been selected at the time of the request for the main scanning is positioned within the first reading region. A film is held flat so as to be parallel to board surface 240 of table 24 in a position at a predetermined distance away from boarding surface 240 by means of first belt 16, second belt 70, first plate spring 28 and second plate spring 74 in first reading region SS.

In step S46, generation of image data of the main scanning range and a shift of carriage 42 are repeated until carriage 42 has been shifted in direction X of FIG. 11, so that the main scanning range is positioned at the end portion of first reading region SS on the slit side. In the same manner as in step 24, image data that has been out putted from digital image processing part 124 is transmitted to PC 130.

In step S47, control part 126 determines whether or not image data of the entirety of frames that has been selected at the time of the request for the main scanning has been acquired. In the case where there is a frame whose the image data has not been acquired, the above described processing is repeated, while in the case where the image data of the entirety of the frames has been acquired, the procedure advances to step S48. When step S45 is repeated, a frame whose the image data has not been acquired is positioned in the first reading region.

In step S48, carriage conveying part 118 conveys carriage 42 to carriage standby position CP.

In step S49, transparency conveying part 116 conveys a film to a position where the front end of the film agrees with home position HP so that the reading operation in the main scanning mode is completed.

Figure 16:
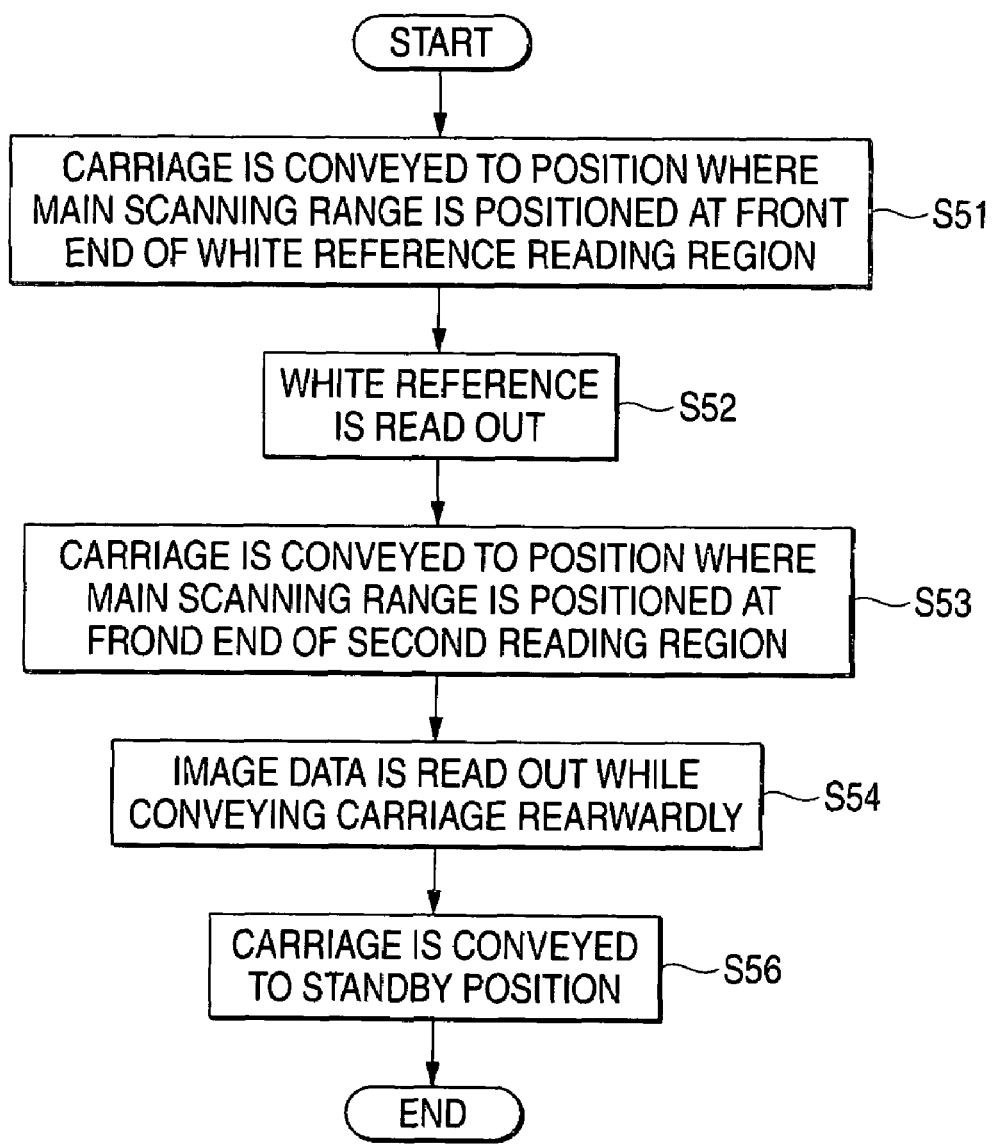
FIG. 16 is a flow chart of one embodiment of the present invention.

FIG. 16 is a flow chart of the reading operation of a mounted film. In the following, the transparency reading operation of a mounted film is described.

When control part 126 receives a request for reading out a mounted film from the user, the reading operation of second reading region SM is started. The request for reading out a mounted film is received from the user, for example, when the mounted film reading initiation button displayed on display 138 is clicked. When the user clicks the mounted film reading initiation button displayed on display 138, CPU 136 transmits a request for reading second reading region SM to image scanner 1 in accordance with a program for controlling the scanner.

In step S51, carriage conveying part 118 conveys carriage 42 according to the instruction of control part 126 until the main scanning range is positioned at the end portion of white reference reading region SW on the slit side, in the same manner as in step S21 in image scanner 1 that has received a request for reading second reading region SM.

In step S52, white reference is acquired and is stored in a memory in the same manner as in step S22.

In step S53, carriage conveying part 118 conveys carriage 42 until the main scanning range is positioned at the end portion of second reading region SM on the slit side.

In step S54, generation of image data of the main scanning range and a shift of carriage 42 are repeated until carriage 42 has been shifted to the position where the main scanning range is positioned at the end portion of second reading region SM on the side opposite to the slit side. The image data that has been outputted from digital image processing part 124 is transmitted to PC 130.

In step S55, carriage conveying part 118 conveys carriage 42 to carriage standby position CP on the slit side of first reading region SS so that the transparency reading operation of second reading region SM is completed.

In PC 130, predetermined image processing is carried out on the received image data according to the scanner controlling program, and the pieces of the image data are stored in RAM 146 in the received order. In addition, in the case where the received image data is displayed on display 138, the pieces of the image data after image processing are written in the region for image display of RAM 146 in the received order. Display 138 displays on its screen the image data that has been stored in the region for image display of RAM 146. The image reading operations in the preview mode and in the main scanning mode both start the reading of the image from an optical image for one line that has been recorded in the recording region at the front end of each frame. Accordingly, the image that corresponds to the optical image for one line that has been recorded at the front end of a frame is first displayed on display 138 in either mode, so that the region within the frame is sequentially displayed from the front end toward the rear end.

As described above, image data is generated in the condition where carriage 42 is stationary while a film is being conveyed in the pre-scanning mode of a strip film. The driving force required for transparency conveying part 116 to convey a film is smaller than the driving force required for carriage conveying part 118 to convey carriage 42, and therefore, a film can be conveyed at a speed higher than that of carriage 42. Accordingly, the image reading apparatus according to the embodiment of the present invention can read out an image at a high speed in the pre-scanning mode of a strip film, in comparison with the conventional image scanner that reads out a document while conveying a carriage.

On the other hand, in the case where a film is directly held in an exchangeable manner, it is difficult to precisely position the film in first reading region SS by means of transparency conveying part 116, while it is easy to precisely position carriage 42, which is not required to be removed, by means of carriage conveying part 118. Image data is generated in the condition where the film is stationary while conveying carriage 42 in the main scanning mode of a strip film, and thereby, a high quality image can be read out.

In addition, the tracks on both sides of a film are engaged with first belt 16 and second belt 70 so that the tracks on both sides of the film are guided using first rail 84, second rail 80, first plate spring 28, second plate spring 74, third rail 485 and fourth rail 489, while first belt 16 and second belt 70 are rotated in sync. As a result of this, the entirety of frames of the film can be passed through first reading region SS without mounting the film on a holder for conveyance and without touching a frame. In the case where a film can be conveyed without touching a frame, no frames are damaged and a high quality image can be read out from the film.

In addition, the smaller the difference is in the length of the optical path between the object and the light receiving surface of image sensor 38 between the time of the reading of a reflection copy and the time of the reading of a transparency, the clearer both the reflection copy and the transparency can be read. According to the embodiment of the present invention, a film is guided and the film is positioned in the direction perpendicular to the board surface in first reading region SS by means of first rail 84 and second rail 80, which can be formed thinner than a roller or the like, and therefore, the film can be held in a position close to the table in first reading region SS. Accordingly, a high quality image can be read out from a film.

Furthermore, the directions in which a film and the carriage are conveyed can be set to be opposite to each other in the pre-scanning mode of a strip film and in the main scanning mode of a strip film, and thereby, the direction in which the main scanning range shifts relative to the film (sub-scanning direction) can be made the same in the two modes. The sub-scanning direction relative to the film can be made the same in the two modes, and thereby, the top and the bottom of the object recorded in a frame can be made the same in the two modes on the screen of display 138 without changing the order of alignment of pixels, using RAM 146.

There is dispersion in the distribution of the amount of light emitted in the direction of the main scanning from first illumination part 110, depending on the position of the sub-scanning direction, and the greater the distance is in the sub-scanning direction, the lower the level tends to become at which the inter-relationship between the distributions of the amounts of illumination light in the two main scanning ranges is involved. In addition, in the case where the distribution of the amount of illumination light in the main scanning direction from first illumination part 110 in white reference reading region SW is different from the distribution of the actual amount of illumination light in the main scanning direction from first illumination part 110 in each line of first reading region SS and mounted film reading region SM, the precision of shading correction is decreased. In the image reading apparatus according to the embodiment of the present invention, first reading region SS and mounted film reading region SM are aligned in proximity to each other in the sub-scanning direction with white reference region SW positioned in between, and thereby, the error margin can be reduced between the distribution of the amount of illumination light from first illumination part 110 in each line of first reading region SS and mounted film reading region SM, and the distribution in the amount of illumination light from first illumination part 110 exhibited by white reference data. Accordingly, the precision in shading correction in first reading region SS and mounted film reading region SM can be increased.

Figure 17:
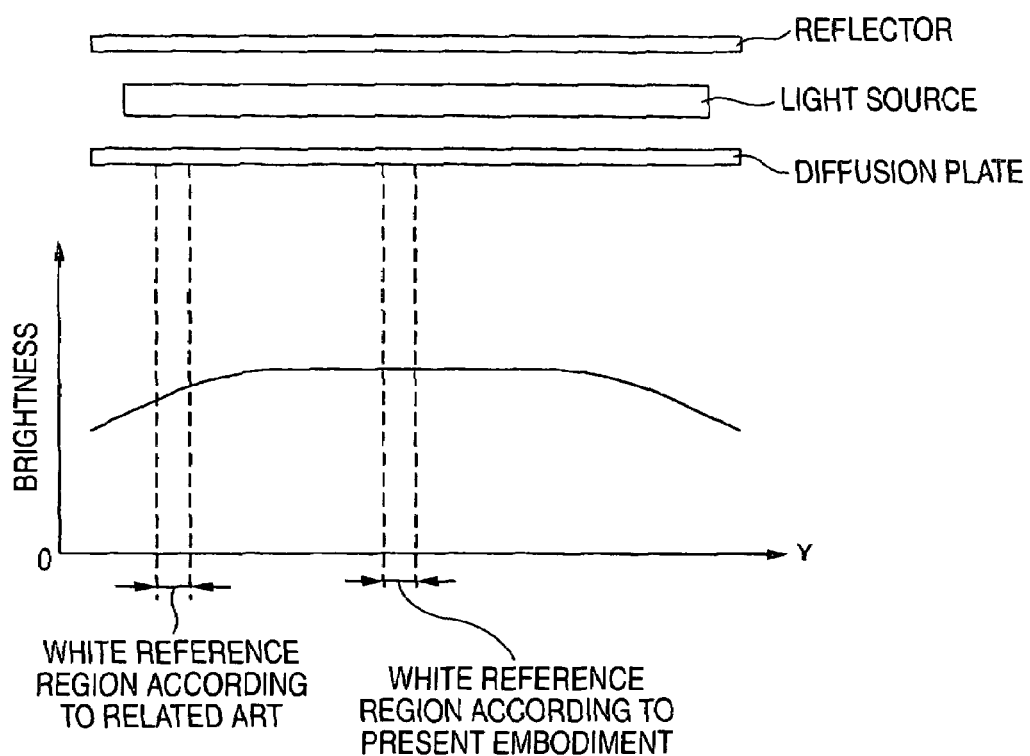
FIG. 17 is a characteristic diagram of one embodiment of the present invention.

In addition, the tubular illumination apparatus that forms first light source 20 of first illumination part 110 is provided in the condition where the longitudinal direction is parallel to the sub-scanning direction. As shown in FIG. 17, the tubular illumination apparatus has properties such that the brightness is high and approximately constant in the center portion in the longitudinal direction, while the brightness is low in the both end portions in the longitudinal direction. In the image reading apparatus according to the embodiment of the present invention, white reference reading division SW is placed in the vicinity of the center of first light source 20 in the longitudinal direction, and therefore, white reference reading region SW, first reading region SS and mounted film reading region SM can be illuminated by the region of first light source 20 where the brightness properties are stable. Accordingly, the precision in shading correction at the time of the reading of a transparency can further be increased.

Though the embodiment where a transparency conveying apparatus according to the first invention is applied to a flat bed type image scanner is described in the above, the present invention may be applied to a so-called scanner dedicated for a film which has no table, a copying machine, a multiple function machine and the like.

In addition, transparency conveying apparatus 17 can be formed so that a transparency according to a variety of standards in addition to a 35 mm strip film can become an object for conveyance.

In addition, though a means for engaging a film with a belt using a plate spring is illustrated in the above described embodiment, a means for engaging a film with a belt without using a plate spring may be adopted. For example, rubber may be used in place of a plate spring. In addition, a pulley may be provided beneath the inside of a belt, for example, so that the pulley is pressed down by an elastic body, and thereby, the belt may be pressed against first rail member 26 by the pulley. In addition, a configuration may be adopted where a pulley pair for rotating a belt, for example, may be provided so as to be movable relative to first rail member 26 so that the pulley pair can be pressed down against the side of first rail member 26 as a result of its own weight or elasticity. In addition, a belt may be used whose a surface, for example, has a function of absorbing a film. In these cases, the first rail member functions as the first rail and second rail according to the claims in the driving section of the conveyance path. In addition, the first rail and the second rail may be formed of one part or may be formed of separate parts.

In addition, though a configuration is adopted in the above described embodiment such that the lower surface of first rail member 26 is pressed against board surface 240 of table 24 as a result of the weight of transparency conveying apparatus 17, a configuration may be adopted where the lower surface of the peripheral portion of the transparency conveying apparatus is supported on the upper surface of body housing 52, so that the lower surface of first rail member 26 is pressed against board surface 240 of table 24 by pressing down first rail member 26 using a spring or the like.

In addition, though an image reading apparatus formed of image scanner 1 and PC 130 is described in the above embodiment, the present invention may be provided for an image reading apparatus that is formed exclusively of image scanner 1.

In addition, though the control sequence in the transparency reading mode of low resolution according to the present invention is described as the control sequence in the pre-scanning mode of a strip film in the above described embodiment, the control sequence in the above described pre-scanning mode may be applied to the main scanning mode of low resolution of a strip film.

In addition, though the direction in which a transparency is conveyed and the direction in which the carriage is conveyed are opposite to each other at the time of the reading of an image in the above described embodiment, the film and the carriage may be conveyed in the same direction.

What is claimed is:

1. An image reading apparatus comprising:
 a transparency conveying apparatus for conveying a transparency to a document reading region of the image reading apparatus, the transparency conveying apparatus including,
 a first rail that guides one end portion of the transparency,
 a second rail that guides the other end portion of the transparency, and is provided in parallel to the first rail so that the document reading region is located between the first and second rails,
 a first belt that conveys the transparency along the first rail, and faces the first rail in a position where the one end portion of the transparency is inserted between the first belt and the first rail,
 a second belt that conveys the transparency along the second rail and faces the second rail in a position where the other end portion of the transparency is inserted between the second belt and the second rail,
 a first engagement member that engages the one end portion of the transparency to the first belt,
 a second engagement member that engages the other end portion of the transparency to the second belt, and
 a drive unit that rotates the first and second belts in synchronization with each other;
 a transparent table that includes a board surface on which the first and second rails can be mounted;
 a first illumination unit that illuminates the document reading region from the board surface side of the table;
 a second illumination unit that illuminates the table from the bottom surface side of the table; and
 a reading unit that reads out a transmission light image of the transparency that is illuminated by the first illumination unit, and that reads out a reflection light image of the reflection copy that is illuminated by the second illumination unit.

2. The image reading apparatus according to claim 1, wherein the transparency conveying apparatus allows the first and second rails to be pressed against the table as a result of the weight of the transparency conveying apparatus.

3. The image reading apparatus according to claim 1 further comprising:
 a third rail that guides the one end portion of the transparency and is provided apart from the first rail in the direction in which the first rail extends; and
 a fourth rail that guides the other end portion of the transparency and is provided parallel to the third rail apart from the second rail in the direction in which the second rail extends,
 wherein the first illumination unit illuminates white reference reading regions, including in a gap between the first and third rails, and in a gap between the second and fourth rails.

4. The image reading apparatus according to claim 3, wherein
 the third and fourth rails are provided in positions apart from the table so that a mounted film enters the gap in the condition where the first and second rails are mounted on the table; and
 the first illumination unit illuminates a second document reading region between the third and fourth rails.

5. The transparency conveying apparatus according to claim 3, wherein the third and fourth rails are provided so as to be freely removable.

* * * * *